United States Patent Office 3,178,385
Patented Apr. 13, 1965

3,178,385
STABLE AQUEOUS DISPERSIONS OF SPONTANE-
OUSLY CROSS-LINKING COPOLYMERS
Karl Dinges, Cologne-Stammheim, and Erwin Müller,
Karl-Heinrich Knapp, and Wilhelm Berlenbach, Lever-
kusen, Germany, assignors to Farbenfabriken Bayer
Aktiengesellschaft, Leverkusen, Germany, a corporation
of Germany
No Drawing. Filed Oct. 11, 1960, Ser. No. 61,829
Claims priority, application Germany, Oct. 15, 1959,
F 29,614; Oct. 15, 1959, F 29,615
9 Claims. (Cl. 260—29.4)

The present invention relates to stable aqueous dis-
persions of spontaneously cross-linking copolymers and
process for production of those copolymers.

It is known to produce aqueous dispersions of spon-
taneouly cross-linking copolymers by copolymerising
acrylic or methacrylic acid amides, in which the amide
groups are substituted by a methylol or methylol ether
group, in aqueous emulsion with other olefinically un-
saturated monomers.

It has also been proposed to subject Mannich bases of
the acrylic and methacrylic amides, together with other
olefinically unsaturated monomers, to copolymerisation
in aqueous emulsion.

According to these processes, copolymers are obtained
which have spontaneously cross-linking properties, since
they can be converted under the action of heat and/or acid
catalysts into cross-linked insoluble copolymers. The
aqueous dispersions of these copolymers do not however
satisfy all practical requirements as regards their sta-
bility. For example, it has been found that a temporary
initial drying of these dispersions, especially with simul-
taneous mechanical stressing, results in the formation of
coagulates. This disadvantage is shown by poor running
properties when coatings or impregnations are prepared
from the said dispersions.

It has moreover been proposed to use aqueous dis-
persions of copolymers of (1) 0.5 to 10% of olefinically
unsaturated monomers with a hydrophilic group, more
especially a carboxyl or oxy group, (2) 0.5 to 15% of a
methylol ether and/or of a Mannich base of the acrylic or
methacrylic acid amide and (3) at least one additional
olefinically unsaturated monomer which is capable of
being copolymerised with the aforesaid monomers, these
aqueous dispersions containing as emulsifier those of
substantially non-ionic character. Dispersions of this
type are free from the disadvantages listed above, that
is to say, they show an adequate stability and good ca-
pacity for re-emulsification.

In a further development of the last-mentioned in-
vestigations, it has now been found that exceptionally
stable aqueous copolymer dispersions can be prepared
in which the advantageous properties of the products
from the last-mentioned process are combined with
particularly good water-proof properties of the films or
coating produced therefrom. Dispersions of this type
are characterized by a content of copolymers of copolym-
erisable olefinically unsaturated monomeric compounds
which contain 0.5 to 25% of a compound of the gen-
eral Formula I

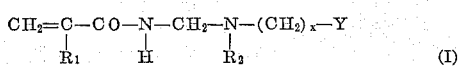

(I)

In this formula $R_1$ represents hydrogen or a lower ali-
phatic or cycloaliphatic saturated hydrocarbon radical
which may be branched or not and advantageously hav-
ing 1 to 7 carbon atoms, $x$ is a whole number from 1 to
20, preferably 2 to 4, Y represents —OH, —COOH,
—COOM, —SO$_3$H, —SO$_3$M,

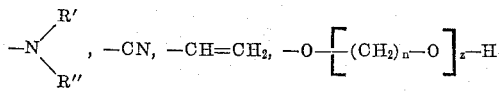

in which M represents a metal atom or ammonium radi-
cal, R′ and R″ may be identical or not and represent
hydrogen or an aliphatic, or cycloaliphatic saturated hy-
drocarbon radical containing 1 to 7 carbon atoms or an
aralkyl or aryl radical and $n$ is a whole number from 1
to 4 and $z$ a whole number from 1 to 25, and $R_2$ repre-
sents hydrogen or an aliphatic or cycloaliphatic saturated
hydrocarbon radical, an aralkyl or an aryl radical, said
radicals having from 2 to 12 carbon atoms or a group
—(CH$_2$)$_x$—Y, wherein $x$ and Y may have the same
significance as above.

Suitable copolymerisable olefinically unsaturated
monomeric compounds according to the general For-
mula I mentioned above are obtained by reaction of
olefinically unsaturated compounds containing the group
—CO—NH— at least once in the molecule with form-
aldehyde and those secondary amines which contain
at least one of the following hydrophilic groups at least
once in the molecule:

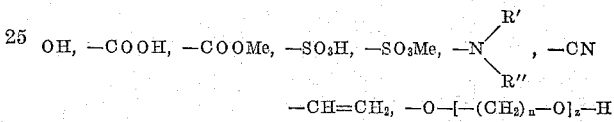

in which Me represents an alkali metal atom or am-
monium group, R′ or R″ represents hydrogen or an alkyl,
cycloalkyl, aralkyl or aryl radical, $n$ is a whole number
from 1 to 4 and $z$ a whole number from 1 to 25.

Suitable carboxylic acid amides which can be used for
preparation of said copolymerisable olefinically unsat-
urated compounds according to Formula I include quite
generally those unsaturated compounds which contain
one or more carbon-carbon double bonds conjugated or
isolated in relation to one or more —CI—NH— groups.
Particularly important carboxylic acid amides for the
present process are α,β-olefinically unsaturated aliphatic
monocarboxylic acid amides, especially those of the
general Formula II

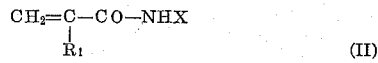

(II)

In this formula $R_1$ and X may be identical or not and
represent hydrogen or a lower aliphatic or cycloaliphatic
saturated hydrocarbon radical which may be branched
or not, advantageously having 1 to 7 carbon atoms.

Suitable condensation products according to Formula
I are for example such consisting of methacrylamide,
formaldehyde and N-n-butyltaurine; acrylamide, formal-
dehyde and n-propyltaurine; methacrylamide, formalde-
hyde and N-methylaminoacetic acid; acrylamide, formal-
dehyde and diethanolamine; acrylamide, formaldehyde
and N-methyltaurine; methacrylamid, formaldehyde and
diethanolamine; methacrylamide, formaldehyde and di-
allylamine; n-methylmethacrylamide, formaldehyde and
diethanolamine; N-butyacrylamide, mormaldehyde and
ethyltaurine; acrylamide, formaldehyde and polyglycol-
ether of N-ethylaminoethanol with 10 ethylenoxide units;
methacrylamide, formaldehyde and iminodipropionic
nitrile; acrylamide, formaldehyde and 3-N-ethyl-propane
sulfonic acid.

Compounds of particular importance preferably used
for the present process are the amides of acrylic and
methacrylic acid as well as the substituted amides derived
from these acids as for example N-methylmethacrylic
acid amide, N-ethylmethacrylic acid amide, N-methyl-
acrylic acid amide, N-ethylacrylic acid amide, N-n-propyl-
acrylic acid amide.

Secondary amines suited for condensation reaction with formaldehyde and carboxylic acid amides as described before correspond to the general Formula III

In the above formula Y represents

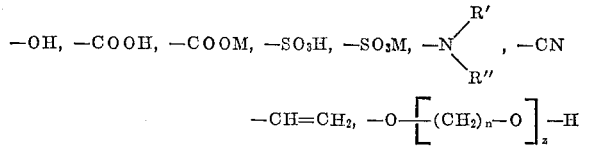

in which M represents a metal atom or ammonium radical, R' and R" may be identical or not and represents hydrogen or an aliphatic saturated hydrocarbon radical containing 1 to 7 carbon atoms or an aralkyl, cycloaliphatic, or aryl radical and $n$ is a whole number from 1 to 4 and $z$ is a whole number from 1 to 25, $x$ is a whole number from 1 to 20, preferably 2 to 4 and $R_2$ represents hydrogen or an aliphatic or cycloaliphatic saturated hydrocarbon radical, an aralkyl or an aryl radical, said radicals having from 2 to 12 carbon atoms or a group $$-(CH_2)_x-Y$$

wherein $x$ and $Y$ may have the same significance as above.

As examples of these compounds may be mentioned the following: N-methylaminoethane sulphonic acid, N-ethylaminoethane sulphonic acid, N-n-propylaminoethane sulphonic acid, N-n-butylaminoethanesulphonic acid, N-methylaminoacetic acid, 3-N-ethyl-propanesulphonic acid, iminodipropionic acid, β-alaninitrile, iminodipropionic acid nitrile N-methylethanolamine, diethanolamine, N-methyl-N-dimethylpropylene-1,3-diamine, and N-diallylamine.

Suitable olefinic monomers which can be copolymerised with compounds of the general Formula I are advantageously one of the following classes of compounds:

(a) α,β-Olefinically unsaturated monocarboxylic acids and their derivatives, such as for example esters of acrylic and methacrylic acids with saturated monohydric aliphatic or cycloaliphatic alcohols containing from 1 to 20 carbon atoms, as for example acrylic acid ethylester, acrylic acid n-butylester, methacrylic acid butyl ester and methacrylic acid n-propylester, acrylic and methacrylic acid amides, acrylonitrile and methacrylonitrile, (b) Aromatic vinyl compounds such as styrene, α-methyl styrene, vinyl toluene, nuclearly halogenated styrenes and other derivatives, (c) Aliphatic vinyl compounds, such as vinyl ethers, vinyl esters, vinyl ketones, vinyl halides, such as for example vinyl chloride, vinyl acetate, vinyl propionate, vinylbutyrate, vinyl ethyl ether, vinyl-propyl-ether and vinylidene chloride, vinyl-methyl ketone, vinyl-ethyl ketone, (d) Conjugated diolefines containing from 4 to 6 carbon atoms, such as butadiene, isoprene, 2,3-dimethylbutadiene, chloroprene, (e) Methylol compounds of acrylic and methacrylic acid amides according to the general Formula IV

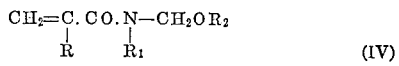

in which R stands for hydrogen or methyl, $R_1$ for hydrogen, alkyl, aralkyl or aryl, $R_2$ for alkyl or cycloalkyl, such as for example methyl, ethyl, n-propyl, isopropyl, n-butyl, isobutyl, cyclohexyl, the alkyl methylol ethers of the acrylic or methacrylic acid amides being of special interest. Methylol-compounds of acrylic and the methacrylic acid which may be copolymerised are disclosed in British patent specifications 802,516 and 792,874 as well as in Belgian patent specifications 545,618 and 593,963, and (f) Mannich bases of acrylic and methacrylic acid amides according to the general Formula V

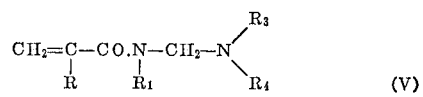

in which R and $R_1$ have the same meaning as in Formula IV and $R_3$ and $R_4$ stand for alkyl, cycloalkyl, aralkyl or jointly for a heterocyclic radical, such as the morpholine radical. Suitable compounds of this type are disclosed in copending U.S. patent application Serial No. 851,971, filed November 11, 1959, and Belgian Patent 584,600.

In addition, a whole series of other olefinically unsaturated monomers can readily be polymerised, but these are generally of less interest industrially. Furthermore, monomers having a cross-linking action can also be used with several olefinically unsaturated groups in quantities of about 0.01 to 10%, related to the weight of the total monomers, such as for example glycol diacrylates, glycol dimethacrylates, acrylic acid allyl ester, methacrylic acid allyl ester, divinylbenzene, trivinyl-benzene, triallyl cyanurate, triacryloyl-hexahydro-s-triazine or substitution products of the said compounds. These monomers are selected according to the properties which are desired of the copolymers. In general, one or more monomers with an elasticising action, such as conjugated diolefines and acrylic esters, are combined with one or more monomers having an intensifying action, such as styrene, acrylonitrile, vinylchloride.

The copolymerisation components of the general Formula I to be used in the process according to the invention are obtained by reaction of unsaturated amides as defined in the above Formula II and secondary amines defined in the above Formula III. This reaction preferably is carried out in aqueous solution, advantageously in 5 to 30% aqueous solution but the reaction can also readily be effected in organic solvents. The procedure generally is that the formaldehyde is added to the unsaturated amides in the form of a 5 to 30%, preferably 5%, aqueous solution, and the secondary amine is run in, it being possible for this amine to be introduced in aqueous solution if desired. A pH value higher than 7 and preferably from 7 to 9 should be maintained during this time. Instead of aqueous formaldehyde solution, paraformaldehyde and other formaldehyde yielding substances such as for example trioxymethylene can equally well be used. In general, the quantities of the reactants to be used correspond to molar ratios, but an excess of formaldehyde up to about twice the molar ratio may however be used. Suitable temperatures for carrying out the present process will in general be between 30 and 100° C., preferably between 50 and 80° C. The reactions are in most cases slightly exothermic and are completed by subsequent heating to 70 to 80° C. The reaction generally takes place within a period of 30 minutes to 1 hour. The reaction may be effected in the presence of small amounts of conventional polymerisation inhibitors, such as for example hydroquinone, tert.-butyl pyrocatechol, phenthiazine and the like, in the usual quantities, i.e. about 0.1 to 2%.

The aqueous copolymer dispersions of the present process are obtained by copolymerising the aforementioned monomers I in a manner known per se in aqueous dispersion with the use of emulsifying agents. Both cation-active and anion-active, as well as non-ionic emulsifiers, and combinations of these emulsifiers, can be used for this purpose. In order to produce the best possible stability or a particularly high capacity for re-emulsification of these dispersions, emulsifying agents of non-ionic character are mainly preferred, and the proportion of cation-active or anion-active compounds should not exceed 0.5%, related to the polymer. The polymerisation is preferably conducted at temperatures below 50° C., preferably at temperatures between 5° C. and 40° C. At pH values from 3 to 7, there is still no cross-linking in the disperson. The pH value of the polymer emulsions can be between 3 and 10; that is to say, the copolymerisation can take place in both the acid range with Redox systems acting below pH=7, such as persulphates, pyrosulphites or bisulphites of the alkali metals or ammonium and also in the alkali range with Redox systems acting above pH=7, such as alkali metal persulphate-triethanolamine. If polymerisation takes place below pH=6, it is advisable for the pH value to be raised above 6 immediately after completing polymerisation, for example by adding ammonia, caustic soda solution or triethanolamine.

The polymerisation recipe preferably contains a polymerisation modifier. Polymerisation modifiers are mostly sulphur containing compounds, e.g. aliphatic mercaptans and organic polysulphides, e.g. dialkyl xanthogen disulphides, di(benzoic acid ester) tetra sulphides, tolyldisulphide and tolyltrisulphide. The preferred compounds are primary, secondary or tertiary aliphatic mercaptans containing not less than six carbon atoms and not more than 18 carbon atoms, as for example n-octylmercaptan, n - dodecylmercaptan, tert. - dodecylmercaptan. The amount of mercaptan modifier used is normally from about 0.05% to about 1% by weight of the polymerisable material, preferably from 0.1 to 0.4%. Mixtures of modifiers may be used. Inorganic per compounds, such as sodium, potassium, or ammonium persulphate, hydrogen peroxide, alkali metal percarbonates, organic peroxide compounds such as acyl peroxide, for example benzoyl peroxide or diacetyl peroxide, lauroyl peroxides, alkyl hydroperoxides, such as tert.-butylhydroperoxide, cumene hydroperoxide, p-menthane hydroperoxide, dialkyl peroxides such as ditert.-butyl peroxide, diisopropylbenzene hydroperoxide, methyl-cyclohexylperoxide, are to be considered as polymerisation catalysts. The inorganic or organic per compounds are most advantageously employed in combination with reducing agents in a manner known per se. Suitable reducing agents are for example sodium pyrosulphite or bisulphite, sodium formaldehyde sulphoxylate, triethanolamine, polyamines, fructose. These catalysts are employed in amounts ranging between 0.01 and 5 percent by weight calculated on the total amounts of monomers employed. With cumene hydroperoxide we prefer to use from 0.02 to 0.04 part by weight of catalyst per 100 parts by weight of polymerisable material. With lauryl peroxide we prefer to use from 0.075 to 0.15 part by weight of catalyst per 100 parts by weight of polymerisable material. Thus we prefer to use from 0.1 to 0.2 part of potassium persulphate per 100 parts by weight of polymerisable material.

The following are mentioned as examples of emulsifiers suitable for the present process; anionic emulsifiers, such as soaps, the salts of long-chain alkyl monocarboxylic acids (fatty acids, resinic acids) (i.e. having from 10 to 20 carbon atoms), alkali metal salts of acid alkyl sulphuric acid esters, salts of alkyl sulphonic acids and alkylaryl sulphonic acids, alkali metal salts of sulphonated or sulphated long-chain hydrocarbons and vegetable fats and oils, water soluble salts of sulphuric acid esters of fatty alcohols, i.e. alcohols corresponding to fatty acids of animal and vegetable fats and oils. Examples of specific emulsifying agents include sodium lauryl sulphate, sodium dodecyl benzene sulphonate, the sodium salt of sulphonated castor oil, the sodium salt of sulphonated or sulphated methyl oleate, sodium oleate, sodium palmitate and sodium stearate. Mixtures of emulsifying agents may be used. The emulsifying agents may also be used in conjunction with compounds that are not true emulsifying agents themselves, but which nevertheless assist in maintaining the reaction ingredients in dispersion. Such compounds are for example the sodium salts of the condensates of naphthalene sulphonic acid and formaldehyde, salts of fatty acid condensation products with oxyalkyl carboxylic acids, aminoalkyl carboxylic acids and others, and finally the salts of sulphonated ethylene oxide adducts. Examples of cationic emulsifiers are salts of alkyl amines, arylamines, alkylaryl amines or resinic amines and inorganic or organic acids as well as salts of quaternary ammonium compounds.

Suitable emulsifiers of non-ionic character are the known reaction products of ethylene oxide with long-chain fatty alcohols, fatty acids, fatty acids amides containing 8 to 20 carbon atoms, or with aromatic hydroxy compounds, the reaction products with more than 4, for example 8 to 50 ethylene oxide units being, preferably applied. There may be mentioned for example: hydroxyethylated tridecyl alcohol, stearyl alcohol or oleyl alcohol with about 20 ethylene oxide units, hydroxyethylated lauric-, palmitic-, stearic- or oleic-acid with about 10 to 20 ethylene oxide units, hydroxyethylated p-octyl phenol, nonyl phenol, dodecyl phenol hydroxyethylated abietyl alcohol with 10 to 30 ethylene oxide units, the hydroxyethylated products according to German Patent 824,949, hydroxy-ethylated lauryl, palmityl, oleyl, or stearyl amide with 5 to 20 ethylene oxide units. Further suitable non-ionic emulsifiers are the esters of long-chain monocarboxylic acids with 8 to 20 carbon atoms and sugars, as for example saccharose-monolaurate, -mono- or -distearate. These emulsifiers are generally used in amounts of 2 to 15 percent by weight, as calculated on the monomers applied.

It is known that particularly good fastness to washing and rubbing of the impregnations, dyeings or prints are obtained if the polymer or copolymer serving as binder contains reactive groupings which make possible a cross-linking of the polymer film on the textile fabric. Such reactive groupings can for example be carboxyl groups, chlorine atoms or aldehyde groups, which are able to react on the fabric with added polyfunctional cross-linking agents, for example water-soluble basic polymers, whereby the polymer film becomes cross-linked and insoluble. Those groupings in the polymer which, without additional use of cross-linking agents, cause a cross-linking of the polymer film upon suitable aftertreatment of the impregnated, dyed or printed fabric are very advantageous, especially as regards the stability of the padding liquors and printing pastes.

Such "spontaneously cross-linking" grouping conform for example to the general formulae:

$$-\overset{O}{\underset{R'}{\overset{\|}{C}}}-N-CH_2-OR''$$

or

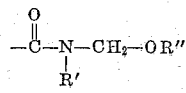

wherein R' represents hydrogen, alkyl, aralkyl or aryl groups, R'' and R''' represent alkyl or cycloalkyl groups or R'' and R''' can jointly represent a heterocyclic ring, for example a morpholine, piperidine or piperazine ring. Polymers which contain these groupings are obtained by copolymerisation of N-methylol ethers or Mannich bases of acrylic or methacrylic acid amide with one or more additional olefinically unsaturated compounds.

The polymer and copolymer dispersions used for the impregnation and as binder for pigment dyeings and printings are generally prepared by polymerisation of suitable polymerisable compounds in aqueous emulsion, and anion-active, or cation-active compounds, possibly combined with a non-ionic compound, can be used as emulsifying agents. The finishes then show particularly good fastness properties if the binders used are dispersions of copolymers containing spontaneously cross-linking methylol ether groups.

The polymer dispersions and the dye liquors and printing pastes prepared therefrom are however not satisfactory with regard to their mechanical stability. A temporary initial drying, especially with simultaneous mechanical stressing, results in immediate formation of coagulates and this disadvantage is shown in the poor running properties during printing. For example, when printing on rollers, coagulates are formed after relatively long mechanical stressing of the printing pastes, caused by the rotation of the cylinder, by the friction of the doctor blade on the cylinder and by local drying of the printing paste, and these coagulates are no longer soluble in the printing paste and can lead to interruptions in the printing, coating of the engravings with printing paste, smudging of the prints and the like. It is just as disadvantageous in film printing if printing pastes temporarily dried on the stencils is no longer soluble in fresh printing paste or cannot be removed with water. It is possible to overcome this by adding large amounts of emulsifiers, protective colloids and/or substances which retard a drying of the printing paste, such as glycerine, to the polymer dispersions or the said printing pastes. However, the difficulties set forth are in principle not obviated by this procedure. Rather is it desirable to have a polymer dispersion which is so stable that it does not coagulate on drying under mechanical stress, but can be mixed again with water to form a dispersion just after the drying and before a film has formed. This property is to be designated as "re-emulsifiability" or "re-dispersibility."

The dispersions obtained by the present process are characterised by a particularly high stability. The stability of these emulsions is so high that the dispersions do not coagulate on being dried under mechanical stress, but can be stirred again with water after they have dried to form a dispersion. The present dispersions have a very good resistance to frost and to electrolytes, apart from the said property of re-emulsifiability. For example, coagulation does not occur either on cooling to a temperature of −20° C. or on adding 20% calcium chloride solutions. The compatibility with fillers, pigments and other additives is also excellent, so that no special precautionary measures are necessary when manufacturing coating agents, adhesives or impregnating agents.

The copolymers of the dispersions which have been described have tertiary amine methylene groups, which are split at elevated temperatures and/or under the action of acid catalysts, and simultaneously cause a spontaneous crosslinking of the copolymers with formation of insoluble crosslinking products. On account of their property of changing under gentle conditions into insoluble cross-linking products, the said polymers and copolymers can be employed for the production of structures of any arbitrary formation, such as coatings, impregnations and adhesive connections. The procedure which can be adopted is for the dispersions to be adjusted with suitable acids or acidly acting compounds, such as hydrochloric acid, sulphuric acid, phosphoric acid, acetic acid, trichloracetic acid, ammonium chloride or acid phosphates to an acid pH value, advantageously from 2 to 5, whereupon the dispersions are applied to suitable supports and the water is vaporised at elevated temperatures, the cross-linking of the polymers then taking place. However, it is also possible to cause the cross-linking merely by the action of heat, for which purpose temperatures from about 80 to 200° C., advantageously 100 to 150° C. have proved to be suitable.

The printing pastes manufactured from the "re-emulsifiable" and spontaneously cross-linking copolymer dispersions which have been described produce prints which show very good fastness to rubbing and washing after a fixing lasting 1 to 10 minutes, hydrolysis of the tertiary amine methylene groups and condensation of the free methylol groups occurring with cross-linking of the polymer film. Above all, the printing pastes are characterized by excellent running properties in machine and film printing. There is no coagulation, even under relatively long stressing. Dried residues dissolve or are dispersed again in the printing paste or can be removed with water, provided not too long a time has elapsed since the drying. On the other hand, the cross-linked product can no longer be dispersed in water to form a dispersion.

The pigment prints produced with the aid of the said copolymer dispersions are distinguished from the copolymer dispersions which have already been proposed for such purposes and which do not carry any radical with reactive and preferably hydrophilic groups and capable of being split off, by the fact that they have a particularly high resistance to scrubbing and rubbing while wet, since the residues carrying hydrophilic groups are split off during the cross-linking process caused by the thermal treatment and thus can no longer influence the water swelling of the polymer films. The polymer films which are obtained thus present quite generally an exceptionally high resistance to the attack of aqueous solutions at different temperatures and also against steam.

The aforesaid polymer dispersions thus have a very wide range of application, for example in calico printing, in the impregnation and coating of textile materials or other fiber substrates of very different types, leather, paper and others, since especially good fastness to washing and rubbing of the impregnations, dyeings or prints are obtained.

There may be added to the dispersion the usual pigment dyestuffs, fillers and emulsifiers. As pigments there come into consideration inorganic and organic pigments, such as phthalocyanine dyes, azo dyestuff pigments, metal oxide and carbon black. There may be added to the mixtures the usual thickening agents, as for instance, water-soluble thickening agents such as tragacanth, starch, cellulose ethers, sodium alginate, polyvinyl alcohol, polyacryl amide and polyacrylic acid salts. There may also be used emulsions of the type "oil in water," as, for instance, benzine thickeners.

The printing pastes have outstanding travelling properties in machine and film printing. Even under prolonged stress no coagulation product is formed. Partially dry residues redissolve or re-disperse in the printing paste or may be removed with water provided not too much time has passed after drying. On the other hand, the cross-linked product cannot be redistributed in water to form a dispersion, the "re-emulsifiability" being definitely limited to the partially dry state before final film formation.

Although in principle it is possible for the re-emulsifiable spontaneously cross-linking copolymer emulsions which have been described to be used without additional cross-linking agents for the production of shaped structures, it can nevertheless be advantageous in many cases to add additional cross-linking agents to the dispersions, for example water-soluble condensation products of aldehydes, more especially formaldehyde, with urea, melamine or alkyl methylol ether derivatives of such compounds, in order to cause an additional cross-linking of the shaped structures.

In the following examples, the parts indicated are parts by weight, unless otherwise mentioned.

*Example 1*

In a reaction vessel equipped with a stirrer mechanism and a thermometer, a mixture of 180 parts of butyl acrylate and 108 parts of styrene is emulsified in a solution of 450 parts of water, 20 parts of the reaction product of 13 to 15 mols of ethylene oxide and 1 mol of oxydiphenyl methane, as well as 12 parts of the condensation product of methacrylamide, formaldehyde and n-butyltaurine (condensation product according to the formula)

$$H_2C=\overset{\overset{\displaystyle CH_3}{|}}{C}-CO-NH-CH_2-\overset{\overset{\displaystyle C_4H_9}{|}}{N}-CH_2-CH_2-SO_3H$$

After the temperature has been raised to 40° C., 1.2 parts of potassium persulphate and 1.8 parts of sodium pyrosulphite are added. The polymerisation is allowed to proceed at about 45° C. After polymerisation has been completed, the substantially 38% copolymer latex which is obtained is adjusted with ammonia to a pH valve of about 7.

A few drops of the dispersion, after being rubbed dry on the palm of the hand, can be stirred with water again to form the original dispersion. Films produced from the dispersion, after being heated to 120° C. (5 minutes), show only a very slight water swelling.

600 g. of petroleum (boiling range about 160 to 230° C.) are incorporated by emulsification into a mixture of 200 g. of the above dispersion with 177 g. of water,
3 g. of a reaction product of 1 mol of cetyl alcohol and 13 to 15 mols of ethylene oxide,
20 g. of a 50% ammonium nitrate or ammonium thiocyanate solution, using a high-speed stirrer (2000 r.p.m.).

A viscous paste is formed which is mixed with 50 g. of a 40% dispersion of Helioechtblau BL in water (Schultz Dyestuff Tables, vol. I, 7th edition, No. 1188), and is printed by conventional methods, using cylinder printing, on to cotton and staple fibres. A deep, brilliant blue tone is obtained, which is resistant to boiling, washing, rubbing and scrubbing after printing and the thermofixing at 130 to 140° C. for 8 to 10 minutes.

In order to test the mechanical stability, this printing paste is treated for 30 minutes in a high-speed stirrer (6000 r.p.m.) and is thereafter exhausted through a suction filter. No residues remain on the filter screen, since no coagulate has formed. The printing plate is thus stable as regards mechanical stressing.

In order to test the re-dispersability of the printing paste after drying, a tensioned stencil gauze is brushed with a layer of about 0.2 cm. thick of the printing paste. At slightly elevated temperature (about 30° C.), the printing paste is allowed to dry for a period of one hour. The dried printing paste can thereafter be removed with cold water with the assistance of a soft brush, and it is stirred into water and filtered. No residues remain on the filter.

*Example 2*

The polymerisation is carried out in accordance with the process of Example 1, with the modification that a monomer mixture of 213 parts of butyl acrylate, 75 parts of acrylonitrile and 18 parts of the compound

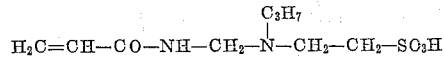

is used.

The dispersion obtained shows the same advantageous properties as that produced according to Example 1.

250 parts of the dispersion obtained as indicated above are mixed with 50 g. of a 6% carboxymethyl cellulose (about 2000 cp.),
30 g. of dimethylol urea (prepared from 2 mols of formaldehyde and 1 mol of urea, pH 11, at room temperature, in concentrated aqueous solution),
550 g. of a 70% emulsion of heavy benzine in water, which contains 1% of a reaction product of 1 mol of cetyl alcohol and 15 to 20 mols of ethylene oxide as emulsifying agent,
20 g. of a 50% solution of ammonium nitrate,
100 g. of a 40% dispersion of a yellow azo dyestuff (Hansagelb 10G, Colour Index [1956], vol. III, No. 11710).

A lustrous yellow colour tone is obtained with this printing paste on cotton, staple fibres and other fabrics consisting of semi-synthetic fibres, the said colour tone being distinguished by a soft "handle" and excellent fastness to washing and rubbing after thermofixing.

The testing of the mechanical stability and the re-dispersability after drying is effected as set out in Example 1. In this case, there are not observed any depositions which cannot be dissolved in water.

*Example 3*

300 g. of a 50% dispersion of titanium dioxide (rutile type) in water, 10 g. of a 30% dispersion of copperphthalocyanine (Heliogenblau B, Colour Index [1956], vol. III, No. 7416) in water, are incorporated by stirring into 250 g. of the dispersion according to Example 1,
100 g. of a 50% solution of a water-soluble condensation product of formaldehyde and melamine,
10 g. of ammonium nitrate,
3 g. of ammonia,
100 g. of a 15% solution of the polymeric alkylmethylol ether of acrylamide,
2 g. of the reaction product of 12 mols of ethylene oxide and 1 mol of oxydiphenyl methane,
225 g. of water.

Using this paste in a machine printing operation, very satisfactorily adhering matt coloured effects are produced on undyed and dyed textiles, these being fast to washing, scrubbing and rubbing and having a pleasing soft handle after dry-fixing at 140° C. for 5 to 7 minutes.

For testing the mechanical stability and the redispersability of the printing paste after drying, the procedure according to Example 1 is followed. Under this test, no residues remain, this being an indication that the paste is stable and capable of being re-dispersed.

*Example 4*

A solution of 530 parts of water, 20 parts of the reaction product of 1 mol of cetyl alcohol and 13 to 15 parts of ethylene oxide is placed in a stirrer-type vessl. About 1/10 of a monomer mixture of 300 parts of butyl acrylate, 180 parts of styrne and 0.25 part of an n-dodecylmercaptan is emulsified in the said solution. After displacing the air by nitrogen and heating the mixture to 35° C., the polymerisation is started by adding 0.5 part of potassium persulphate and 1.0 part of sodium pyrosulphite. Using four dropping funnels, the following substances are steadily run in within 3 hours: (a) the remainder of the monomer mixture, (b) a solution of 20 parts of the condensation product of methylacrylamide, formaldehyde and N-butyl taurine (2-butylaminoethane sulphonic acid) in 100 parts of water, (c) 3 parts of sodium pyrosulphite in 60 parts of water and (d) 2 parts of potassium persulphate in 60 parts of water. The polymerisation temperature is kept at 40 to 45° C. by external cooling. After a final stirring period of 1 to 2 hours, polymerisation is completed. The pH value of the substantially 38% dispersion is adjusted to about pH 7.

100 g. of the dispersion according to the present process are mixed with 5 g. of an ethoxylated oleyl alcohol,
50 g. of a 10% ammonium polyacrylate solution,
25 g. of a 30% solution of diammonium phosphate,
195 g. of water, and
25 g. of a 40% dispersion of a crude azo dyestuff (monoazo dyestuff obtained from 2-amino-1-methoxybenzene-4 - sulphodiethylamide and 1 - (2',3' - oxynaphthoylamino)-5-chloro-2,4-dimethoxybenzene).

600 g. of a high-boiling heavy benzine (boiling range 160 to 230° C.) are then incorporated by emulsification.

A paste is obtained which is printed by film printing on cotton and staple fibres and a deep, brilliant scarlet tone is produced which, after thermofixing (2 minutes at 150° C.), is characterised by a very soft handle and very good fastness to scrubbing, boiling, washing and rubbing.

Example 5

The polymerisation is carried out in accordance with the process of Example 1, with the modification that a monomer mixture of 213 parts of butyl acrylate, 75 parts of acrylonitrile and 18 parts of the compound

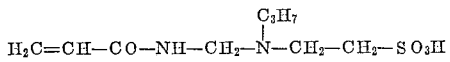

is used.

The dispersion obtained shows the same advantageous properties as that prepared according to Example 1.

The substantially 38% dispersion which is obtained is adjusted with ammonia or triethanolamine to a pH value of 6 to 7. Likewise, after being rubbed dry, the dispersion can be stirred again with water without an irreversible coagulate being formed.

500 g. of heavy benzine are incorporated by emulsification into a mixture of 280 g. of the above dispersion,
20 g. of a 25% solution of polyvinyl alcohol (500 cp.),
50 g. of a 1% solution of the polymeric methylmethylolmethacrylamide,
130 g. of water,
20 g. of a 50% solution of ammonium nitrate, and
80 g. of a 40% dispersion of chlorinated copper phthalocyanine (Heliogengrün B, Colour Index [1956], vol. III, No. 74280)

are admixed therewith.

A viscous printing paste is obtained which is printed on cotton and staple fibres by the conventional processes. After thermofixing (5 minutes at 140° C.), the print is fast to boiling, washing and rubbing and also has good resistance to perchlorethylene, so that it is resistant to chemical cleaning.

The mechanical stability and the re-dispersability of the printing paste after drying is tested as described under Example 1 and no visible depositions are formed.

Example 6

Using a high-speed stirrer (about 2000 r.p.m.), 600 g. of heavy benzine (boiling range 160 to 230° C.) are incorporated by emulsification into a mixture of 100 g. of the dispersion according to Example 5, with
50 g. of a 4% solution of carob bean flour in water,
5 g. of a product of 1 mol of stearyl alcohol and 15 to 20 mols of ethylene oxide,
10 g. of a still water-soluble condensation product of 2 mols of formaldehyde and 1 mol of urea,
20 g. of a 50% solution of ammonium thiocyanide,
155 g. of water, and
60 g. of a 25% dispersion of gas soot in water.

A strong black tone is obtained with this paste on cotton viscose rayon, perlon and acetate rayon by the usual methods, using film or cylinder printing, and after thermofixing for 5 to 10 minutes at 135 to 140° C., the said black tone is fixed so as to be fast to washing and rubbing. This print has good resistance to agents used for chemical cleaning (chlorinated hydrocarbons).

Example 7

The process described in Example 3 is modified by the 20 parts of methacrylamide-formaldehyde-butyl taurine condensation compound being replaced by 30 parts of a compound of methacrylamide, formaldehyde and sarcosine corresponding to the formula

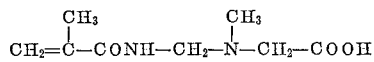

The dispersion also shows a very high stability "(re-emulsifiability)".

Example 8

A solution of 860 parts of water, 24 parts of an alkyl sulphonate with 10 to 18 carbon atoms and 400 parts of a 25% solution of the reaction product of 1 mol of cetyl alcohol and 13 to 15 parts of ethylene oxide is placed in a stirrer-type vessel. After adding 0.8 part of sodium hydroxide, 1.12 parts of 30% ammonia and 0.24 part of sodium triethanolamine, the solution has a pH value of 7.5 to 8.0. At 25° C., there is now added a mixture of 248 g. of styrene, 400 g. of butyl acrylate, 80 g. of ethyl acrylate, 32 g. of methacrylamide-methylolmethyl ether and 40 g. of the compound

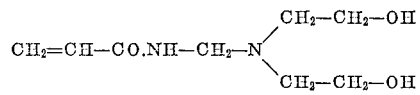

and polymerisation is initiated with 0.42 g. of potassium persulphate.

On completing the polymerisation after about 5 hours, a 38 to 39% very stable latex is obtained.

Example 9

The polymerisation is carried out in accordance with the process of Example 1, with the modification that a monomer mixture of 71.5 parts of styrene, 25 parts of acrylonitrile and 3.5 parts of the sodium salt of the condensation product of acrylamide, formaldehyde and N-methyltaurine of the formula

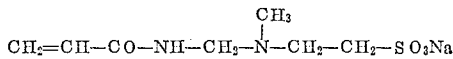

is used.

A very stable aqueous dispersion is obtained with a solid content of 38 to 39%, and this dispersion is suitable for example for impregnating or painting purposes.

Example 10

A mixture of 2.2 litres of butadiene, 320 g. of styrene and 280 g. of the compound.

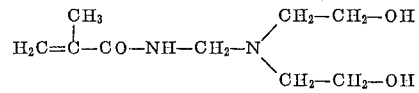

and also 4 g. of tertiary dodecylmercaptan are emulsified with a solution of 100 g. of disproportionated abietic acid in 3000 g. of water in a 10-litre autoclave fitted with a stirrer mechanism and thermometer. The emulsion is adjusted to a pH value of 10 at a temperature of 25° C. with a normal sodium hydroxide solution and thereafter 2 g. of sodium formaldehyde sulphoxylate, 2 g. of the sodium salt of ethylene diamine tetracetic acid and 0.2 g. of iron sulphate are added. Polymerisation commences on adding 1.2 g. of cumene hydroperoxide dissolved in 100 g. of styrene, and when the conversion is 80%, the polymerisation is stopped with a solution of 5 cc. of 40% sodium dimethyl-dithiocarbamate in 100 cc. of water. The latex is then stabilised with a solution of 40 g. of a suitable substituted phenol in 50 cc. of benzene.

Example 11

Using a pressure-tight reaction vessel with a capacity of about 40 litres and equipped with a stirrer mechanism and thermometer, the mixture of 8 litres of butadiene, 2680 g. of acrylonitrile, 20 g. dodecylmercaptan and 80 g. of the compound

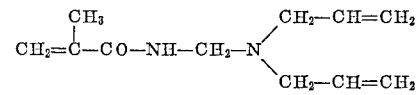

is emulsified with a solution of 320 g. of an alkyl sulphonate with 14 to 16 carbon atoms in 11.2 litres of water. After adding 8 g. of the sodium salts of formaldehyde sulphoxylic acid, 8 g. of the sodium salt of ethylene diamine tetracetic acid and 0.8 g. of FeSO$_4$.ZH$_2$O, the pH value is adjusted to 10 with normal sodium hydroxide solution and the mixture cooled to +5° C. On adding 7 g. of tert.-butyl hydroperoxide, the polymerisation

What we claim is:

1. A stable latex of a copolymer of (1) 0.5–25% by weight of an olefinically unsaturated amine of the general formula:

$$CH_2=C(R_1)-CO-NH-CH_2-N(R_2)-(CH_2)_x-Y$$

wherein $R_1$ is selected from the group consisting of hydrogen and methyl, Y is a member selected from the group consisting of $$-OH, -COOH, -COOM, -SO_3H, -SO_3M, -N\begin{matrix}R'\\R''\end{matrix}$$

$$-CH_3, -CH=CH_2$$

and poly(alkylene oxide) groups, in which M represents a member selected from the group consisting of a metal atom and an ammonium radical, $R'$ and $R''$ are each selected from the group consisting of hydrogen, an aliphatic saturated hydrocarbon radical having from 1–7 carbon atoms, a cycloaliphatic saturated hydrocarbon radical, an aralkyl radical and an aryl radical, and wherein $x$ is a whole number from 1 to 20, and $R_2$ represents a member selected from the group consisting of hydrogen, an aliphatic saturated hydrocarbon radical, a cycloaliphatic saturated hydrocarbon radical, an aralkyl radical, an aryl radical, said radicals having 2 to 12 carbon atoms, and a group $-(CH_2)_x-Y$, wherein $x$ and $Y$ have the same significance as pointed out above, and (2) 75–99.5% by weight of a monomer having 1–2 carbon-to-carbon double bonds and being selected from the group consisting of alpha,beta - olefinically unsaturated monocarboxylic acids and the esters and amides thereof, the alcohol component of said esters containing 1–20 carbon atoms, aromatic vinyl compounds, aliphatic monovinyl compounds, conjugated diolefins containing from 4–6 carbon atoms, methylol compounds of acrylic and methacrylic acid amides of the general formula:

$$CH_2=C(R_3)-CO-N(R_4)-CH_2OR_5$$

in which $R_3$ is a member selected from the group consisting of hydrogen and methyl, $R_4$ is a member selected from the group consisting of hydrogen, alkyl, aralkyl and aryl, $R_5$ is a member selected from the group consisting of alkyl and cycloalkyl, Mannich bases of acrylic and methacrylic acid amides of the general formula:

$$CH_2=C(R_3)-CO-N(R_4)-CH_2-N\begin{matrix}R_6\\R_7\end{matrix}$$

in which $R_3$ and $R_4$ have the same meaning as in the formula immediately above, and $R_6$ and $R_7$ stand for a member selected from the group consisting of alkyl, cycloalkyl, aralkyl, and the constituents necessary to form, together with the adjacent nitrogen atom, a heterocyclic radical selected from the group consisting of a morpholyl, a piperidyl, and a piperazine ring, said stable latex containing an emulsifying agent and being adjusted to a pH value of 3–10.

2. A process for the production of the stable latex of claim 1 wherein said monomers are copolymerized in the specified amounts in an aqueous dispersion at a pH value of 7–9 and at a temperature of 30–100° C. in the presence of 2–15% by weight of a non-ionic emulsifier in combination with no more than 0.5% by weight of a member selected from the group consisting of an anionic and a cationic emulsifier, said percentages being by weight based on the total weight of monomers employed.

3. A printing and dyeing composition comprising the latex of claim 1.

4. The printing and dyeing composition of claim 3 containing a pigment in addition to said latex.

5. The printing and dyeing composition of claim 3 containing in addition to the latex a cross-linking agent for the copolymer component thereof, said cross-linking agent being a water-soluble condensation product of formaldehyde with a member selected from the group consisting of urea, melamine, and an N-alkyl methylol ether thereof.

6. A cross-linked copolymer prepared by subjecting the copolymer of claim 1 to a temperature of about 80–200° C.

7. A cross-linked copolymer obtained by subjecting the copolymer of claim 1 to a temperature of about 80–200° C. in the presence of an acid catalyst which is employed in an amount sufficient to adjust the acidity of the latex to a pH value between 2 and 5.

8. A process for coating and impregnating textile material which comprises employing in the coating agent which is impregnated and coated thereon a binding agent which comprises the latex of claim 1, and cross-linking the resultant coating by the application of elevated temperatures thereto.

9. A process for coating and impregnating textile material which comprises employing in the coating agent which is impregnated and coated thereon a binding agent which comprises the latex of claim 1, and cross-linking the resultant coating by contacting it with an acid catalyst in an amount sufficient to adjust the pH heerof to a value of bewteen 2 and 5, and vaporizing the water therefrom at elevated temperatures.

References Cited by the Examiner
UNITED STATES PATENTS

| | | | |
|---|---|---|---|
| 2,478,378 | 8/49 | Dickey | 260—86.1 |
| 2,595,907 | 5/52 | Thomas | 260—85.5 |
| 2,681,322 | 6/54 | Aver | 260—29.6 |
| 2,762,719 | 9/56 | Kleiner et al. | 260—29.6 |

MURRAY TILLMAN, *Primary Examiner.*

D. ARNOLD, LEON J. BERCOVITZ, WILLIAM H. SHORT, *Examiners.*